(12) United States Patent
Evans et al.

(10) Patent No.: US 12,181,427 B1
(45) Date of Patent: Dec. 31, 2024

(54) X-RAY SYSTEM

(71) Applicants: THE NOTTINGHAM TRENT UNIVERSITY, Nottingham (GB); CRANFIELD UNIVERSITY, Cranfield (GB)

(72) Inventors: Paul Evans, Nottingham (GB); Keith Rogers, Swindon (GB)

(73) Assignees: The Nottingham Trent University, Nottingham (GB); Cranfield University, Cranfield (GB)

( * ) Notice: Subject to any disclaimer, the term of this patent is extended or adjusted under 35 U.S.C. 154(b) by 0 days.

(21) Appl. No.: 18/722,957

(22) PCT Filed: Dec. 13, 2022

(86) PCT No.: PCT/GB2022/053189
§ 371 (c)(1),
(2) Date: Jun. 21, 2024

(87) PCT Pub. No.: WO2023/118800
PCT Pub. Date: Jun. 29, 2023

(30) Foreign Application Priority Data

Dec. 21, 2021 (GB) .................................... 2118665

(51) Int. Cl.
*G01N 23/20008* (2018.01)
*G01N 23/04* (2018.01)
(Continued)

(52) U.S. Cl.
CPC ....... *G01N 23/20008* (2013.01); *G01N 23/04* (2013.01); *G01N 23/083* (2013.01);
(Continued)

(58) Field of Classification Search
CPC ............ G01N 23/20008; G01N 23/04; G01N 23/083; G01N 23/20083; G01N 2223/316; G01N 2223/401; G01N 2223/50
See application file for complete search history.

(56) References Cited

U.S. PATENT DOCUMENTS

2006/0153330 A1    7/2006  Wong et al.
2016/0329119 A1*  11/2016  Cao .................. G01N 23/20083
(Continued)

FOREIGN PATENT DOCUMENTS

CN        204744209 U      11/2015
EP       3 790 025 A1       3/2021
(Continued)

OTHER PUBLICATIONS

International Search Report and Written Opinion dated Feb. 17, 2023 from corresponding International Patent Application PCT/GB2022/053189, 10 pages.
(Continued)

*Primary Examiner* — Courtney D Thomas
(74) *Attorney, Agent, or Firm* — Ruggiero McAllister & McMahon LLC

(57) ABSTRACT

A sample inspection system (100) includes an X-ray emitter, a collimator (170) and a first energy resolving detector (180) arranged along a symmetry axis (105). The X-ray emitter generates at least one focused conical shell beam (150) of X-ray radiation comprised of X-ray photons that propagate through a focal point on the symmetry axis downstream of the X-ray emitter. The collimator (170) has one or more channels, each channel being adapted to receive diffracted or scattered radiation propagating either along the symmetry axis, or parallel with the symmetry axis, or both along and
(Continued)

parallel with the symmetry axis (105). Upon incidence of the conical shell beam (150) onto a sample (106) the first energy resolving detector (180) detects radiation diffracted or scattered by the sample (106) via the collimator (170).

19 Claims, 12 Drawing Sheets

(51) Int. Cl.
*G01N 23/083* (2018.01)
*G01N 23/20* (2018.01)

(52) U.S. Cl.
CPC . *G01N 23/20083* (2013.01); *G01N 2223/316* (2013.01); *G01N 2223/401* (2013.01); *G01N 2223/50* (2013.01)

(56) References Cited

U.S. PATENT DOCUMENTS

| | | | |
|---|---|---|---|
| 2017/0003234 A1 | 1/2017 | Gall et al. | |
| 2023/0118850 A1* | 4/2023 | Dicken | G01V 5/222 378/87 |

FOREIGN PATENT DOCUMENTS

| | | |
|---|---|---|
| GB | 2 560 165 A | 9/2018 |
| WO | 2014/111684 A1 | 7/2014 |
| WO | 2021/176197 A1 | 9/2021 |

OTHER PUBLICATIONS

GB Search Report dated Aug. 2, 2022 from corresponding GB Patent Application No. GB2118665.5, 2 pages.

Dabrowski et al.; "X-ray microlaminography with polycapillary optics", Applied Physics Letters, 102, 224104, 2013, doi: 10.1063/1.4809583; 5 pages.

Dicken et al., "Depth resolved snapshot energy-dispersive X-ray diffraction using a conical shell beam"; Optics Express, vol. 25, No. 18, Sep. 4, 2017, 8 pages.

Dicken et al., "Energy-dispersive X-ray diffraction using an annular beam"; May 13, 2015, vol. 23, No. 10, 12 pages.

Evans et al.; "High intensity x-ray diffraction in transmission mode employing an analog of Poisson's spot", Applied Physics Letters, 97, 204101 (2010), 3 pages.

Pang et al., "Small-angle scatter tomography with a photon-counting detector array", Phys Med Biol., 2016, 61(1), pp. 3734-3748, doi:10.1088/0031-9155/61/10/3734.

Paterno et al., "Laue lens to focus an X-ray beam for radiation therapy"; Journal of Applied Crystallography, 2016, 49, http://dx.doi.org/10.1107/S1600576716000716, 11 pages.

Snigirev et al., "Focusing high-energy x rays by compound refractive lenses", Feb. 1, 1998, vol. 37, No. 4, Applied Optics, pp. 653-662.

Uschmann et al., "High efficiency, high quality x-ray optic based on ellipsoidally bent highly oriented pyrolytic graphite crystal for ultrafast x-ray diffraction experiments", Applied Optics, vol. 44, No. 24, Aug. 20, 2005, 7 pages.

Xu et al., "High resolution Physio-chemical Tissue Analysis: Towards Non-invasive In Vivo Biopsy", Scientific Reports, 6:16937, DOI: 10.1038/srep16937, Feb. 4, 2016, 14 pages.

* cited by examiner

X-RAY SYSTEM

CROSS-REFERENCE TO RELATED APPLICATIONS

The present application is a 35 U.S.C. § 371 National Stage patent application of International patent application PCT/GB2022/053189, filed on Dec. 13, 2022, which claims priority to United Kingdom patent application GB 2118665.5, filed on Dec. 21, 2021.

BACKGROUND OF THE DISCLOSURE

1. Field of the Disclosure

The present disclosure relates to an X-ray system and in particular to an X-ray system for probing a biological sample.

2. Description of Related Art

Health provision around the world depends heavily on accurate diagnostics of various diseases including cancer. This often requires performing a biopsy followed by an examination of the removed tissue (histopathology) by highly trained pathologists. There are over 1.6 million such biopsy procedures performed in the US annually, for the diagnosis of breast cancer alone. These biopsies are costly (~$200-$500 per procedure) and particularly stressful for the patients. Eighty percent of patients undertaking a biopsy for breast cancer diagnosis are ultimately found to have non-invasive pathologies and require no further intervention.

Non-invasive techniques based on enhanced imaging methods have been proposed. However, these techniques often require the use of contrast media or molecular tags. An example of such methods is provided in Xu, G., Meng, Zx., Lin, Jd. et al. High resolution Physio-chemical Tissue Analysis: Towards Non-invasive *In Vivo Biopsy*. *Sci Rep* 6, 16937 (2016). These imaging techniques, still lack specificity and can require additional histopathological examinations.

It is an object of the disclosure to address one or more of the above mentioned limitations.

SUMMARY OF THE DISCLOSURE

According to a first aspect of the disclosure, there is provided a sample inspection system comprising an X-ray emitter, a collimator, and a first energy resolving detector arranged along a symmetry axis; wherein the X-ray emitter is adapted to generate at least one focused conical shell beam of X-ray radiation comprised of X-ray photons that propagate through a focal point on the symmetry axis downstream of the X-ray emitter; the collimator comprising one or more channels, each channel being adapted to receive diffracted or scattered radiation propagating either along the symmetry axis or parallel with the symmetry axis or both along and parallel with the symmetry axis, and wherein upon incidence of the conical shell beam onto a sample the first energy resolving detector is arranged to detect radiation diffracted or scattered by the sample via the collimator.

For instance, the symmetry axis can be a rotational symmetry axis.

Optionally, X-ray photons propagate radially to trace the surface of a double cone with all X-ray photon trajectories crossing the focal point on the symmetry axis, wherein the focal point forms an apex of the double cone.

Optionally, the X-ray emitter comprises an X-ray source, an X-ray lens, and a beam former.

Optionally, the beam former comprises one or more slits. For instance, the said one or more slits can have a circular shape.

Optionally, the beam former is movable along the symmetry axis.

Optionally, the X-ray lens comprises a polycapillary optical element.

Optionally, the polycapillary optical element comprises an array of hollow channels for guiding X-rays via total external reflections.

Optionally, the X-ray lens comprises at least one of a compound refractive lens, a bent crystal and a Laue lens.

Optionally, the X-ray lens is movable along the symmetry axis to focus an input beam at a plurality of focal points on the symmetry axis.

Optionally, the X-ray emitter is adapted to generate a plurality of focused conical shell beams of X-ray radiation, wherein each beam has a different energy and a different opening angle.

Optionally, the first energy resolving detector is spatially resolving. For instance, the first energy resolving detector can be a pixelated detector.

Optionally, the sample inspection system comprises a second energy resolving detector.

Optionally, the second energy detector has an annular shape for detecting X-ray radiation transmitted through the sample.

Optionally, the sample inspection system comprises a calculator configured to calculate a parameter of the sample based on scattered or diffracted radiation detected by the first energy resolving detector; wherein the parameter comprises a lattice spacing or d-spacing of the sample.

Optionally, the calculator is configured to identify the physico-chemical structure of the sample based on the detected diffracted or scattered radiation.

Optionally, the calculator is configured to calculate variations between positions, widths, and relative heights of scattering maxima obtained from the sample and from a reference sample.

Optionally, the calculator is configured to compare the lattice spacing of the sample with pre-existing lattice spacing values of known tissue types or known material.

Optionally, the calculator is configured to perform image reconstruction based on transmitted radiation detected by the second energy resolving detector.

According to a second aspect of the disclosure, there is provided a method of inspecting a sample, the method comprising:
  providing an X-ray emitter, a collimator and a first energy resolving detector arranged along a symmetry axis; wherein the collimator comprises one or more channels; each channel being adapted to receive diffracted or scattered radiation propagating along and/or parallel with the symmetry axis;
  generating at least one focused conical shell beam of X-ray radiation comprising of X-ray photons that propagate through a focal point on the symmetry axis downstream of the X-ray emitter; and
  detecting with the first energy resolving detector via the collimator, radiation diffracted or scattered by the sample upon incidence of the conical shell beam onto the sample.

Optionally, the method comprises identifying a physico-chemical structure of the sample based on the detected diffracted or scattered radiation.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DETAILED DESCRIPTION OF THE DISCLOSURE

Figure 1A:
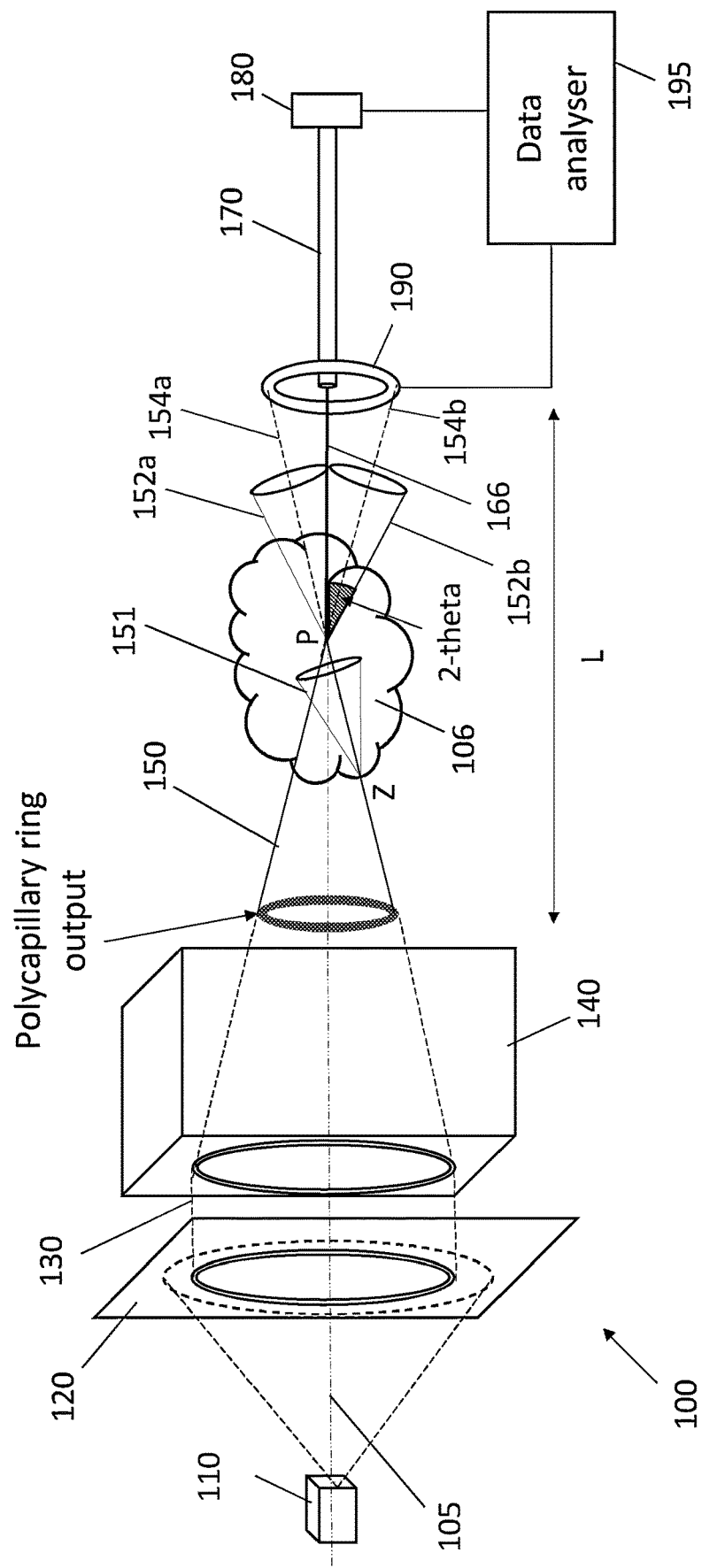
FIG. 1A is a diagram of a detection system for probing a biological sample.

FIG. 1A is a diagram of a detection system 100 for probing a biological sample. The system 100 includes an electromagnetic EM source 110 such as an X-ray point source aligned with a mask or beam former 120 for forming a hollow beam or shell beam 130. The X-ray source 110 can vary depending on the application. For instance, an X-ray source adapted to provide electromagnetic radiations having an energy about 50 keV can be used for interrogating soft tissues, while another X-ray source providing higher energy can be used for in-vivo applications. For example, 30 keV molybdenum (Z of 42) anode radiation with characteristic lines at 17.6 keV and 19.7 keV can be filtered using a molybdenum k-edge (at 20.0 keV) filter to produce a "moly/moly" spectrum often used in mammography. Another option is to filter the molybdenum spectrum with a rhodium (Z of 45) k-edge (at 23.22 keV) filter to produce a "moly/rhodium" spectrum to make the beam more penetrating when imaging a larger or denser breast. Rhodium is also an alternative anode material with its principal characteristic radiation at an energy of 20.3 keV with a less intense emission at 22.7 keV thus using rhodium filter, with a k-edge cut-off at 23.22 keV provides a "rhodium/rhodium" spectrum useful for denser tissue. The X-ray source 110 can be a polychromatic source or a monochromatic source of X-ray radiation. A monochromatic shell beam would enable the detection of a single or narrow band of d-spacings, while a polychromatic shell beam would establish the presence of a potential range of d-spacings within the sample.

The mask 120 can be formed by a solid body made of a radiopaque material provided with a shaped slit. Example of radiopaque materials that can block X-rays include tungsten or alloys made of steel and lead or from combinations of these materials. In the example of FIG. 1A, the mask 120 has a circular-shaped slit for forming the shell beam 130.

An X-ray focusing lens 140 is provided to focus the shell beam 130, hence generating a conical shell beam 150. The conical shell beam 150 is comprised of X-ray photons that propagate through a focal point P on a symmetry axis 105 downstream of the X-ray source 110. The symmetry axis 105 can also be referred to as the rotational symmetry axis or the optical axis of the system. The location of the focal point P is defined by the focal length of the X-ray lens 140.

The X-ray focusing lens 140 can be provided by a polycapillary optical element such as a polycapillary lens. A polycapillary lens includes an array of hollow channels for guiding X-rays via total external reflections. Polycapillary optics can comprise of arrays of hollow glass tubes used to collect, focus, and redirect X-ray and neutron beams over a range of angles and energies. X-rays striking the interior of hollow channels at grazing incidence are guided along the channel by total external reflection. The reflection of X-rays, down the length of the capillary, is governed by the critical angle (e.g. 0.1° at 20 keV) and is inversely proportional to the photon energy. When the incidence angles are smaller than the critical angle X-rays are transmitted down hollow glass tubes with high efficiency. Polycapillary optics have been reported to produce a focal spot to conduct absorption tomosynthesis (See "X-ray microlaminography with polycapillary optics", Applied Physics Letters 102, 224104 (2013), Dabrowski et al doi: 10.1063/1.4809583).

It will be appreciated that the X-ray focusing lens 140 can be implemented in other alternative ways. For instance, compound refractive lenses can be used for focusing X-rays. A compound refractive lens can be formed of a linear array of several individual lenses manufactured in low-Z materials such as beryllium, boron, carbon, aluminium, or polymers. The compound refractive lens can focus hard X-rays in one or two dimensions. An example of such a compound refractive lens is provided in Snigirev, A. (1998). "Focusing high-energy X-rays by compound refractive lenses". Applied Optics. 37 (4): 653-62. doi: 10.1364/AO.37.000653.

Bent crystals, including highly oriented pyrolytic graphite crystal (HOPG) can be used to focus X-rays. This technique has been used to focus monochromatic X-rays of 4.5 keV photon energy, in "High efficiency, high quality x-ray optic based on ellipsoidally bent highly oriented pyrolytic graphite crystal for ultrafast x-ray diffraction experiments" Uschmann, I. et al Applied Optics Vol. 44, Issue 24, pp. 5069-5075 (2005) https://doi.org/10.1364/AO.44.005069.

The X-ray focusing lens 140 can also be implemented as a Laue lens. A Laue lens can be formed of a set of crystals that exploit X-ray diffraction in transmission geometry to produce a convergent beam. For instance, "Laue lens to focus an X-ray beam for radiation therapy", Paterno et al 2016 J. Appl. Cryst. 49 468-478, describes a Laue lens composed of an ensemble of Si crystals with curved diffracting planes. The Laue lens is capable of focusing a 80 keV beam 50 cm downstream of the lens.

A collimator 170 is provided along the symmetry axis 105 at a distance L from the output of the X-ray lens 140. The collimator 170 is elongated and provided with a longitudinal axis substantially collinear with the symmetry axis 105. The collimator 170 can be arranged to be concentric with the symmetry axis 105, such that the input surface of the collimator is substantially normal to the symmetry axis 105. The space provided between the X-ray lens 140 and the collimator 170 forms an inspection volume for receiving a sample. In this case the collimator is provided by a single channel to collect a pencil of diffracted rays, however the collimator 170 could include a plurality of channels.

A first energy resolving detector 180 is provided along the symmetry axis 105 and positioned such that its detection surface is substantially parallel to the output surface of the collimator 170. The energy resolving detector 180 and the collimator 170 can be coupled in different ways. For instance, the detector 180 can be in contact with the output surface of the collimator 170 or separated by a gap. For applications requiring a high fidelity signature, an analyser such as a rotating crystal analyser, can be inserted at the output of the collimator 170.

In the example of FIG. 1A, the collimator 170 is provided by a single collimator channel having an input facing at the sample end and an output facing the detector 180. In this case the detector 180 can be provided by a single element detector also referred to as point detector. A second energy resolving detector 190 such as an annular pixelated energy resolving detector can be provided around the first energy resolving detector 180.

The first detector 180 and the second detector 190 are coupled to a data analyser 195 to store and analyse the collected data. The data analyser 195 can comprise a storage medium and a processor which executes instructions for carrying out processing of the data. The instructions can be downloaded or installed from a computer-readable medium which is provided for implementing data analysis according to the disclosure. For example, the processor can be adapted to execute an algorithm to calculate a parameter of the sample which can be used to identify a physico-chemical structure or property of a region of the sample. For instance, the parameter can be a lattice spacing (d-spacing) calculated from the known diffraction angle or two-theta angle and the measured energy of the photons at the detector 180 via Bragg's law. The result can then be communicated to a user by a suitable display or other type of indicia.

The processor can also be adapted to run an artificial intelligence or machine learning algorithm or a deep learning algorithm for determining the d-spacing or signature of the region of interest of the sample based on the collected scattered signal and or in combination with the measurements made using the second detector 190. Such a processor can be located in a remote server in communication with the detector.

The sample data can be compared with data from pre-existing bespoke databases of known tissue types or known material. These databases can have been obtained using the detection system. Comparison can be assessed using parameterised, high frequency information or through deep learning.

In operation a sample 106 is provided within the inspection volume around the focal point P. The sample can be a biological sample such as a body portion of a patient or subject for performing physico-chemical analysis of tissue in vivo. The X-ray photons from the X-ray source 110 are moderated to form a focused conical shell beam that converges to the focal spot P on the rotational symmetry axis, downstream of the X-ray source 110. The inspection volume can be adapted to accommodate a particular body region of the patient. As the conical shell beam 150 interacts with the sample/body region 106, a portion of the beam is scattered or diffracted by Bragg diffraction, another portion can be absorbed by the sample, and the remaining portion transmitted through the sample.

The portion of diffracted radiation also referred to as diffracted flux, can be made of a plurality of cones of diffraction also referred to as Debye cones. The Debye cones are concentric about a primary ray. A small portion of an incoming, or primary X-ray beam incident onto the sample is scattered at measurable angles if its wavelength is similar to the lattice distances (or d-spacing) present in the sample under inspection. For ideal, polycrystalline materials interrogated by pencil beams, the photon scatter follows a cone distribution, with the source of the scattering at the cone apex. In FIG. 1A a Debye cone 151 is represented generated at point Z. The sample 106 can contain polycrystalline regions and/or liquid regions having a certain degree of order, with a particular d-spacing. The angular distribution of the scattered intensity is unique to each different ordered structure and thus can be used to determine characteristics such as lattice dimensions, crystallite size, and percentage crystallinity. The key relationship between the lattice spacing (d), and the angle ($\theta$) subtended by the diffracted or scattered radiation from a plane of atoms inside a crystal is embodied within the well-known Bragg condition: $n\lambda = 2d \sin\theta$, in which $\lambda$ is the wavelength of the incoming radiation and (n) is an integer. The angle subtended by the diffracted or scattered radiation and the interrogating or primary radiation is $2\theta$ (two theta). The system permits to calculate d-spacing values of the order of 50 angstroms obtained from low-dose measurement of low-angle diffracted photons from a relatively small gauge volume.

X-ray scattering characterisation studies of medical tissues, regardless of inductive or deductive approach, have concluded that X-ray scattering features (especially those in the small angle regimes) are correlated to tissue type, in particular, malignancy. Scattering feature consistencies between studies are frequently identified, relatively high sensitivities and specificities recorded, and the physico-chemical origins of such features have been postulated. Changes to positions, widths, and relative heights of scattering maxima indicate structural modifications at the corresponding length scale. For example, glycation on collagen, degree of protein hydration and collagen microstructural damage (mechanical) can be quantified though such modifications. Many studies have also provided compelling evidence that cancer invasion is associated with changes in the collagen scaffold extra cellular matrix of tissue microenvironments.

The Debye cones are generated from every point along a circular path defined by the intersection of the conical shell 150 with the sample 106. The conical shell beam 150 focuses at point P and generates a plurality of Debye cones having a common apex at point P. Two Debye cones 152*a* and 152*b* are represented.

Two rays of transmitted flux 154*a* and 154*b* are also illustrated. The transmitted rays are detected by the detector 190 to measure an absorption of X-ray radiation within the sample. The data collected by the detector 190 can be used to form an X-ray absorption image of the sample. In turn the absorption image can be used to identify a particular area of interest within the sample/body region. The area of interest can then be targeted for further analysis by collecting diffraction data with the first detector 180.

The primary beam focus at point P forms a measurement gauge volume (or specimen at the primary focus) in the shape of a bicone or back-to-back cones that can have different slant heights (considering a practical shell beam that produces an annular footprint). The integrated intensity of scattered photons collected at a fixed 2-theta diffraction angle from this bicone volume element is approximately equal to the integrated intensity of scattered photons propagating at the same fixed 2-theta diffraction angle from around an annular measurement gauge volume (being approximately independent of diameter). This approximation neglects relative changes in the absorption path length and any variation in sample parameters across the different measurement gauge volumes considered in each case.

The system of FIG. 1A provides a virtual biopsy probe that enables clinically significant signatures to be acquired from deep within tissues non-invasively. A specific result, for instance, based on d-spacing calculated values, can be obtained relatively quickly.

In FIG. 1A, the mask 120 is located between the X-ray source 110 and the X-ray lens 140. However it will be appreciated that the mask 120 could also be provided at the output of the X-ray lens 140. The mask 120, and the X-ray focusing lens 140 can be designed to achieve various arrangements of focusing conical shell beams. For instance, the mask 120 can be designed with multiple slits for generating multiple conical shells beams. The mask 120 and the X-ray focusing lens can be designed so that different conical shells beams converge at different points on the symmetry axis.

Figure 1B:
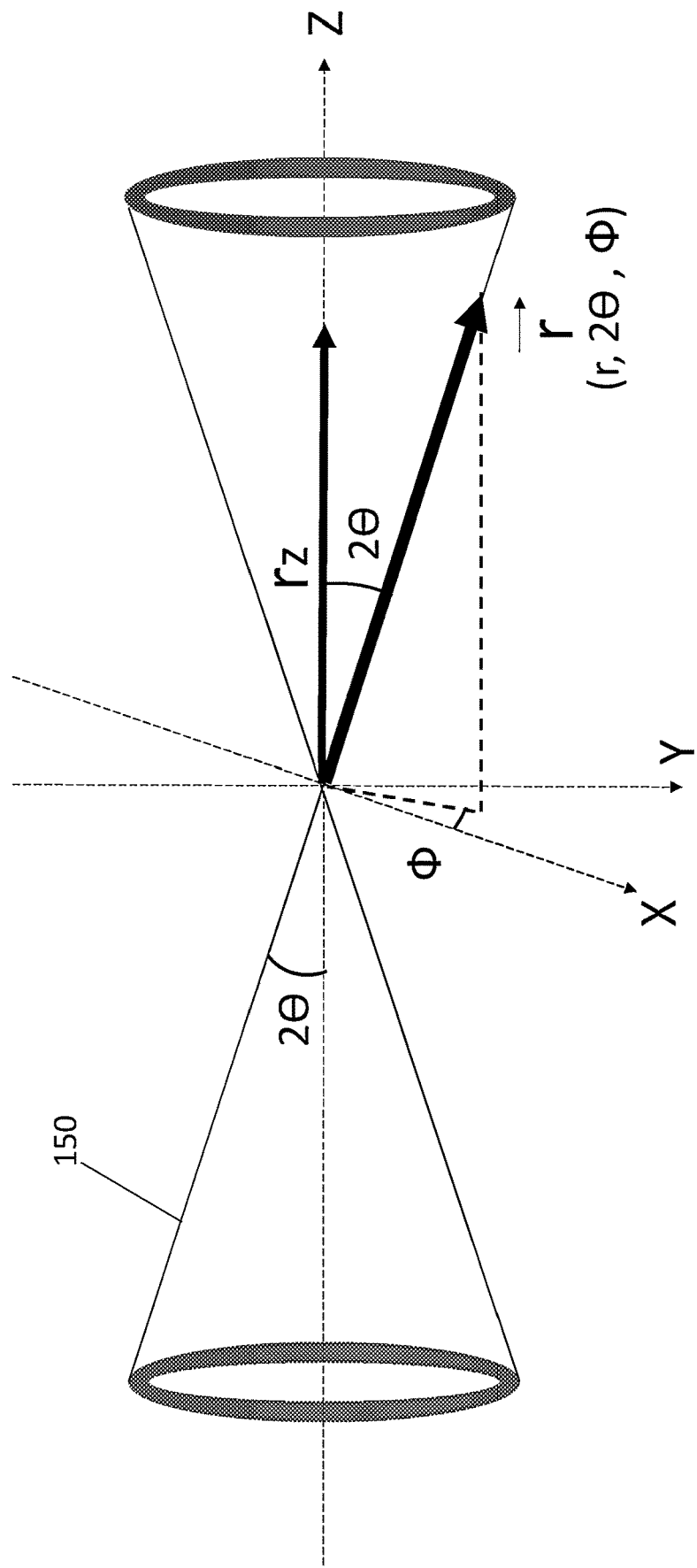
FIG. 1B is a conical shell beam described using a spherical coordinate system.

FIG. 1B shows a shell beam described using a spherical coordinate system.

The spherical coordinate system has its origin at the focal point P and the z-axis coincident with the rotational symmetry axis 105, with positive z coordinates downstream of the focal point (away from the X-ray source 110).

The propagation direction for each photon composing the conical (or bicone) shell beam 150 is described by a direction vector $\vec{r}$ with a constant 2-theta value (r, 2θ, φ): where r is the radial distance, 2θ is the polar angle, and φ is the azimuthal angle. Each shell beam photon has a common z-axis direction component that can be described (downstream of the source) with reference to the focal point P or on the rotational symmetry axis as the origin of a spherical coordinate system. Photons with the same r value form a ring-shaped distribution that propagates radially from the origin. The diameter of the ring expands concentrically in planes parallel with axial (x,y) plane as it propagates in the positive direction along the rotational symmetry z axis. Thus, photons composing the shell beam propagate at an angle 2θ away from the focal point P and all photons crossing the symmetry axis at a focal point have a common direction vector component $r_z$ along the rotational symmetry axis Z. Thus, the dominant direction component is along the z-axis in the positive direction. The photons are directed to form a double shell cone with a common vertex (focal point) on the rotational symmetry z axis.

The shell beam 150 produces an annular footprint or focal spot in the (x,y) plane due to a finite angular spread bounded by an inner and outer envelope about 2θ due to engineering tolerances, finite collimation widths and point spread function (PSF) of each optical component. For instance, a finite focal spot rather than a (mathematical) focal point is produced in practical systems.

Figure 2:
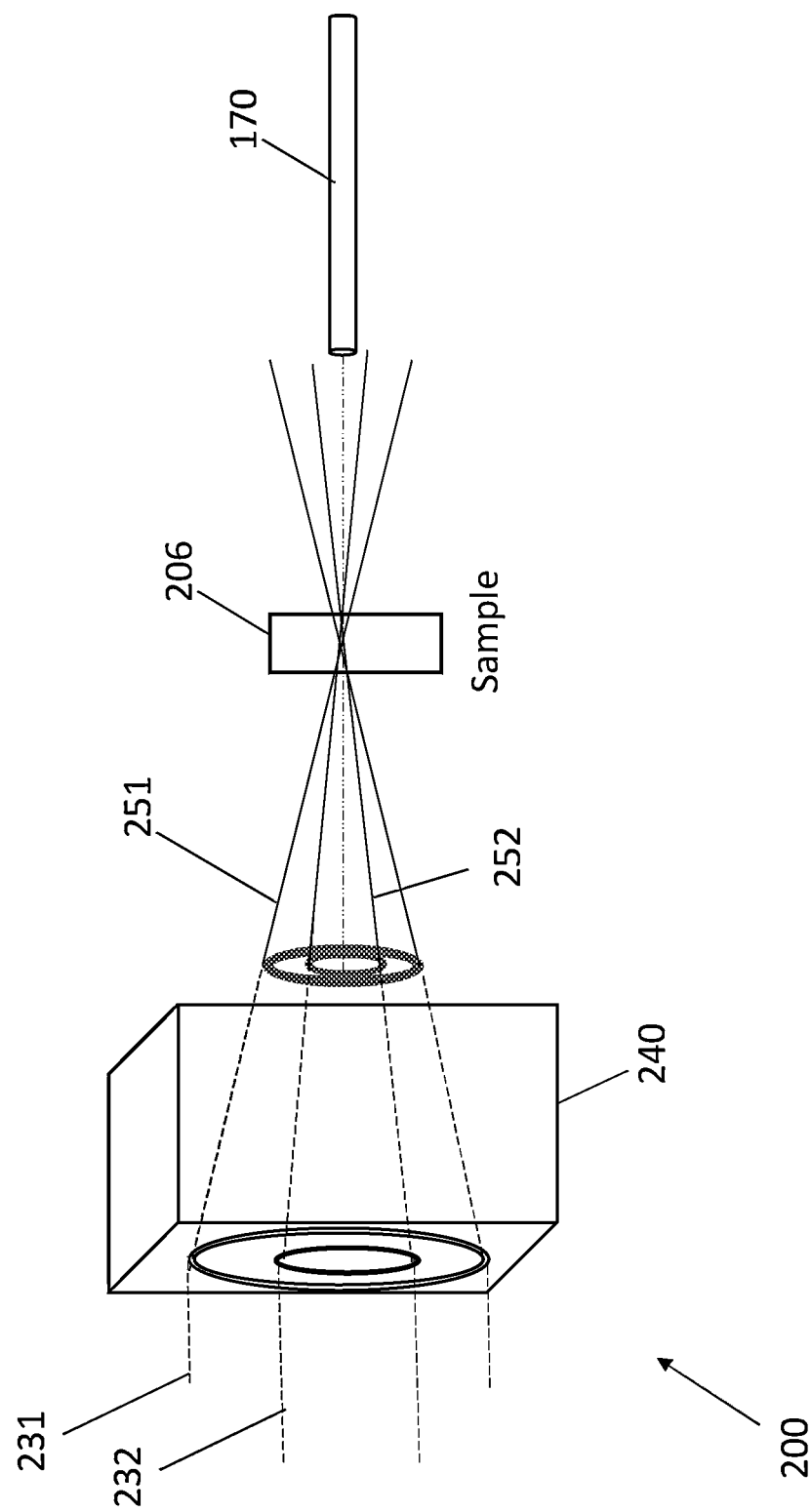
FIG. 2 is a diagram of an arrangement for generating two focusing conical shell beams of X-ray radiation.

FIG. 2 is a diagram of an arrangement for generating two focusing conical shell beams of X-ray radiation. The conical shell beams 251 and 252 are focused on a sample 206 around at same focal point. In this case, the mask (not shown) has two concentric circular-shaped slits of different diameter for forming two incoming X-ray beams 231 and 232. The inner conical shell beam 252 has a higher energy (and smaller opening angle and therefore 2-theta take-off angle) than the outer conical shell beam 251. Each beam is, therefore, encoded by its own energy (mean or monochromatic) such that the energy of one beam is different from the energy of another. This enables two or more 2-theta angles to be employed. Each convergent beam has a different opening angle (and thus 2-theta take-off angle) to interrogate the same d-spacing over a broad range of energies and/or to expand the d-spacing range.

Figure 3A:
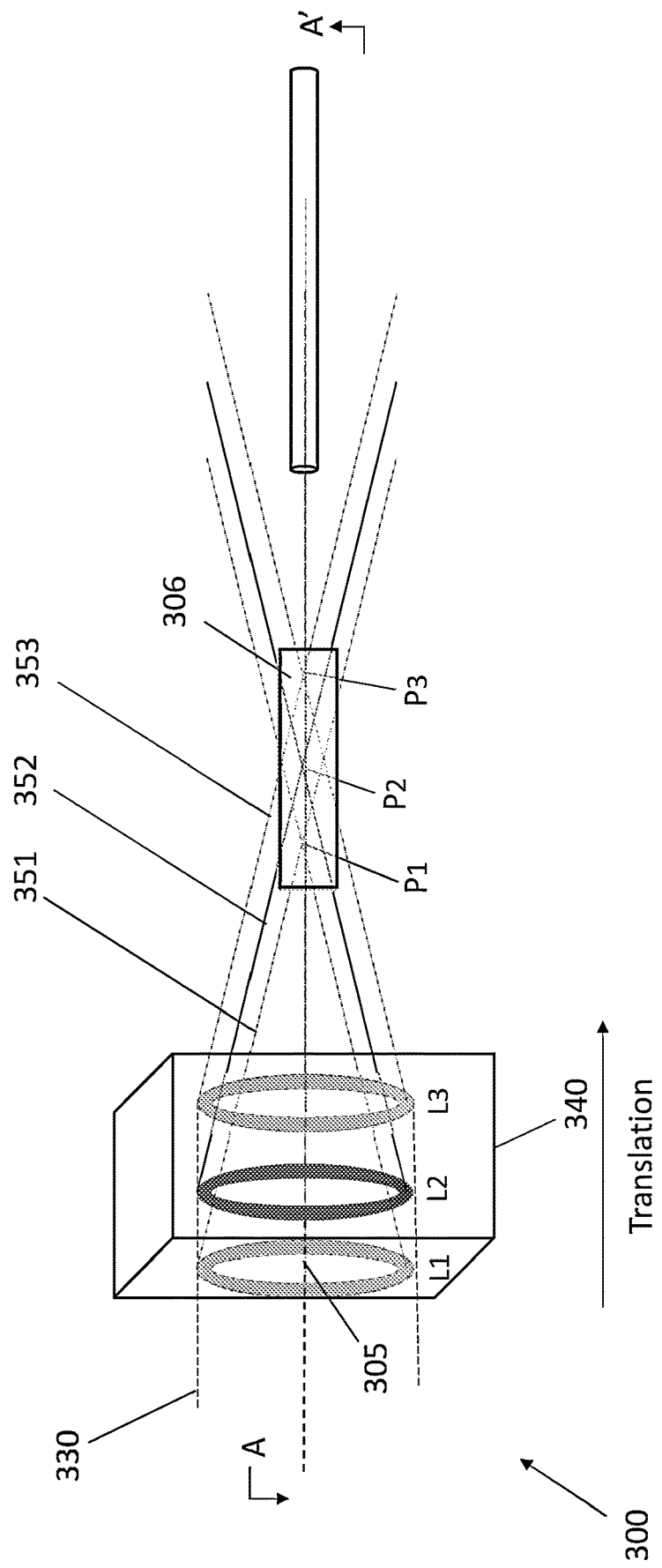
FIG. 3A is a diagram of an arrangement for generating three conical shell beams of X-ray radiation focusing at different points.

FIG. 3A is a diagram of an arrangement for generating three conical shell beams of X-ray radiation focusing at different points. Each one of the conical shell beams 351, 352, 353 is generated at a particular point in time by translating the focusing lens 340 away from the X-ray source 110, while the position of the mask remains fixed. In this case, the mask (not shown) has a single circular-shaped slit like in FIG. 1A for forming the incoming beam 330. The X-ray focusing lens 340 has a polycapillary structure designed to focus the beam 330 with a given focal length. The focal points P1, P2, and P3, also referred to as primary beam foci, are generated at times t1, t2, and t3, respectively. The relative translation of the focusing lens 340 results in a larger ring diameter on the polycapillary input to produce a translated focal spot with a constant 2-theta or with a changing 2-theta as determined by the optical arrangement of 340. The focusing lens 340 can be moved in discrete steps followed by discrete measurement steps. Alternatively, the focusing lens 340 can be translated continuously over a small axial range. In this case measurement can also be performed continuously. The acceptance angle of the polycapillary can define or restrict the amount of translation. A polycapillary can be designed with a relatively large acceptance angle to permit for an extended translation.

As a result, the sample 306 can be probed with several conical shell beams focusing at three different points along the axis 305. The system of FIG. 3 can be extended to a number N of conical shell beams, in which N is an integer greater than 2.

Figure 3B:
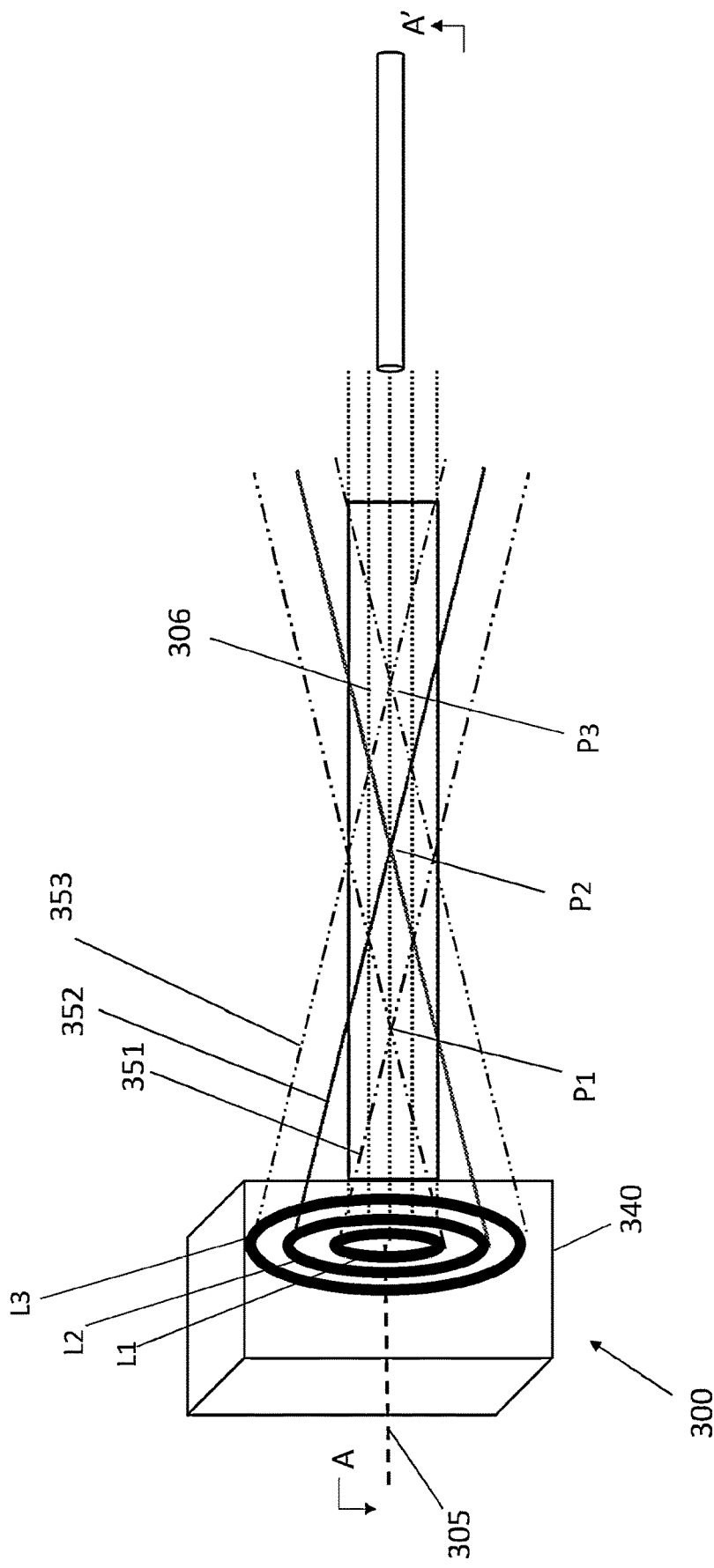
FIG. 3B is a diagram of another arrangement for generating three conical shell beams of X-ray radiation focusing at different points.

FIG. 3B shows a diagram of another arrangement for generating three conical shell beams of X-ray radiation focusing at different points. The arrangement is similar to the arrangement of FIG. 3A, however in this case the mask can be translated along the axis 305 to change the 2-theta angle and the lens 340 remains fixed. The three foci P1, P2, and P3 occur simultaneously and can have their 2-theta angles changed by relative translation of the mask between the X-ray source and the X-ray lens 340. Alternatively, the mask can be placed after the X-ray lens (both configurations would effect a change in the 2-theta for all foci). Therefore translation can be implemented in the solid angle emission cone from the source or in the output solid angle emission from the optic. The foci P1, P2, and P3 could be coincident or separate as shown in FIG. 3B. The convergence or non-convergence would be determined by the optical arrangement of 340, rather than the mask. When the mask is placed between the X-ray source and the X-ray lens 340 the 2-theta angle decreases when the mask moves away from the source and increases when the mask moves away from the lens 340.

Figure 4A:
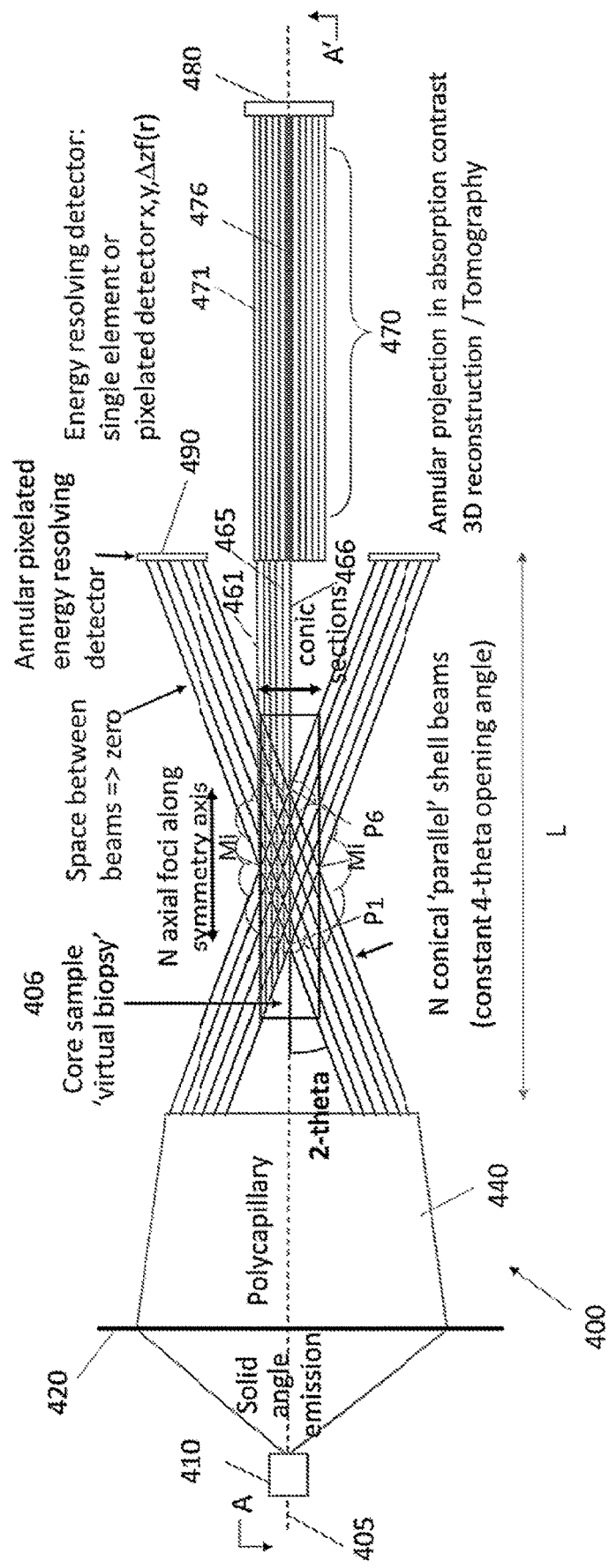
FIG. 4A is a cross section of a multiconfocal detection system.

FIG. 4A shows a cross section of a multi-confocal detection system 400 along a line A-A'. The system 400 includes an X-ray point source 410 aligned with a mask 420, an X-ray lens 440, a collimator 470, a first detector 480, and a second detector 490 aligned along an optical or symmetry axis 405.

The X-ray focusing lens 440 is configured to provide a number N of conical shell beams focusing at different points along the symmetry axis. In this specific example N=6 and 6 conical shell beams are represented; however N could be extended depending on the application.

For instance, the X-ray lens 440 can be provided with six discrete concentric annular arrays of polycapillaries, in which each of the six foci have the same 2-theta angle. This can be achieved by engineering a multi-annular structure on the output of a polycapillary optic to support, align, and point each of the six annular arrays to the correct foci positions on the symmetry axis. The multi-annular output structure provides an alignment mechanism between each successive annular array of capillaries. Alternatively, the X-ray lens 440 (polycapillary) could be manufactured one annular array at a time with each successfully focused annular bundle being glued, set, or potted before repeating the process for additional annular arrays.

The X-rays make a nominally constant 2-theta angle with respect to the rotational symmetry axis 405. Multiple offset conical shells resulting in two different sets of parallel rays (all with the same 2-theta) intersect on the rotational symmetry axis, in any cross-section, through the symmetry axis. This provides a parallel and convergent interrogating beam geometry which produces multiple offset foci (P1-P6) simultaneously along the rotational symmetry axis.

The collimator 470 is provided along the optical axis 405 at a distance L from the output of the X-ray lens 440. The collimator 470 includes a plurality of channels extending between its input and its output. The channels have a cross section allowing the channels to be arranged in a tessellated fashion. In FIG. 4A, the channels are arranged around a central channel 476. The channels' walls can be relatively thin. For instance, the walls can be formed from suitable material to block or substantially attenuate X-ray radiation, such as tungsten or lead antimony alloy. Also, the narrow photon acceptance angle and small field of view of each channel means that photons with paraxial trajectories can encounter relatively long attenuation paths within a single septal wall (and at greater paraxial angles through many such walls) to greatly increase the probability of attenuation of such photons before reaching a detection surface. Thus, the thickness of the septal walls can be relatively thin, of order of a microns to a mm or more for X-ray energies of the order of 50 keV or more, due to the high aspect ratio (length divided by width) of the channel dimensions.

The first energy resolving detector 480 is provided along the symmetry axis 405 and positioned such that its detection surface is substantially parallel to the output surface of the collimator 470. The first energy resolving detector 480 can be provided by a single area detector or as a pixelated detector. The second energy resolving detector 490 is an annular pixelated energy resolving detector provided around the first energy resolving detector 480. A platform, not shown, can be provided between the X-ray lens 440 and the collimator 470 to receive a sample 406. The platform can be designed to allow a patient or subject to be positioned in a desired way, hence allowing inspection of a specific body region.

In operation, the sample 406 is placed on a path of the symmetry axis 405 and positioned such that the conical shells beams focus in a suspicious area within the sample to capture the molecular signatures from that area of interest. The N conical shell beams converge simultaneously at different points to form N primary beam foci along the symmetry axis 405. In FIG. 4, N=6 and six foci (P1-P6) are represented. The central channel 476 of the collimator 470 is aligned with the symmetry axis 405. As a result, the central channel 476 collects a central pencil or ray of diffracted flux 466. The central pencil of diffracted flux 466 is surrounded by a plurality coaxial cylinders of diffracted flux (i.e., the parallel trajectories of the collimated diffracted photons compose coaxial right cylindrical surfaces as directed by the rotationally symmetric tessellation of parallel collimation channels). For clarity, only the top longitudinal side surface of each cylinder 461-465 are represented. These cylinders of diffracted flux are collected by the channels of the collimator 470 surrounding the central channel 476. The energy resolving detector 480 detects the energy of the central beam 466 and the energy of the cylinders of diffracted radiation 461-465 via the collimator 470. The central region of the detector 480 detects the integrated intensity of the central pencil 466. Depending on the number N of conical shells of radiation, this can lead to a number N of foci. The transmitted rays of radiation are collected by the annular energy resolving detector 490. The data collected by the detector 490 can be used to obtain an X-ray spectral absorption image of the sample.

Figure 4B:
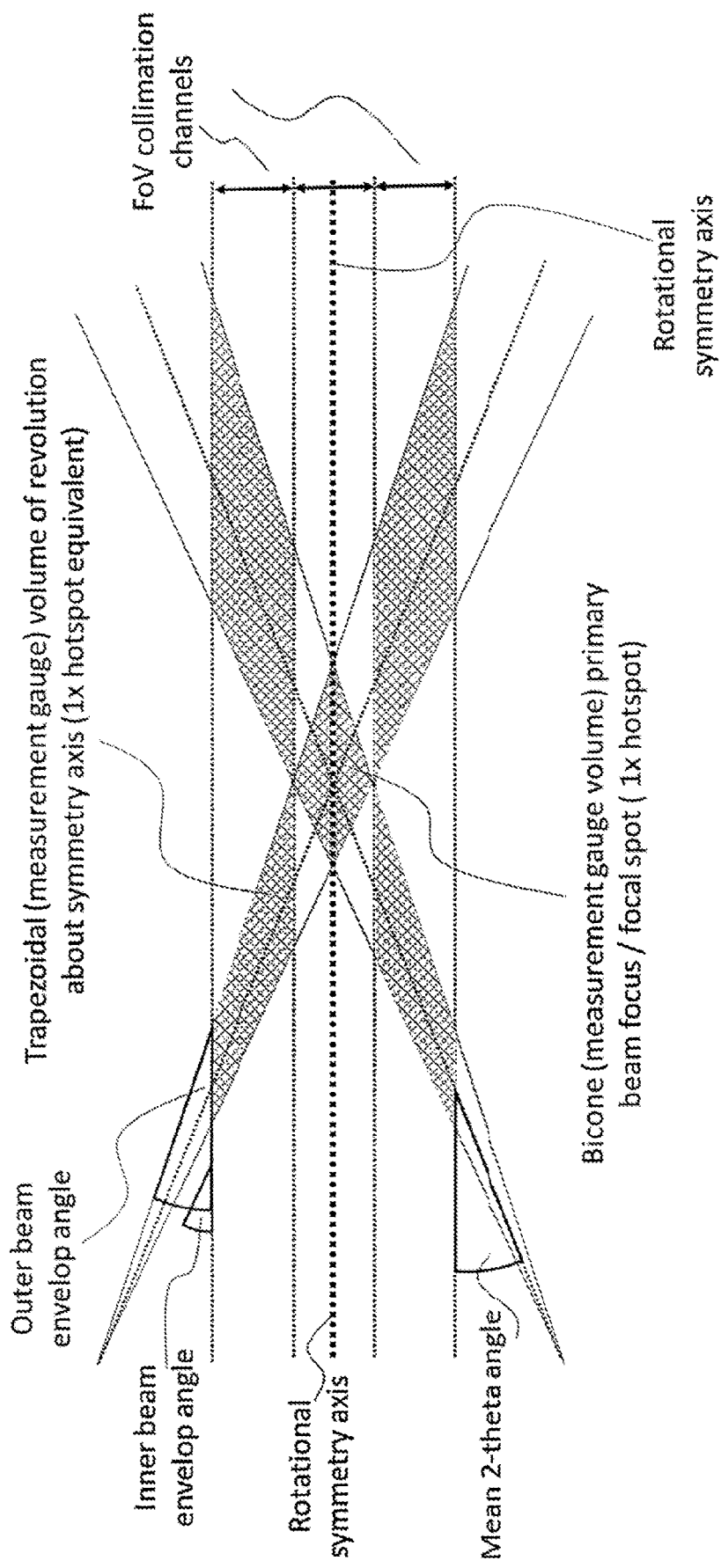
FIG. 4B is a cross section through the measurement gauge volume formed by a single focusing shell beam of the system of FIG. 4A when the said beam has an angular range.

FIG. 4B is a cross section through the measurement gauge volume for a single focused beam of the system of FIG. 4A. The conical shell beam has an envelope that is slightly diverging and defined by an inner and outer beam angle. The divergence is shown for illustrative purpose. This gives rise to a central bicone measurement gauge volume on the symmetry axis and two additional measurement gauge volumes with rotational symmetry represented in FIG. 4B as a pair of mirror image trapezoidal areas. A 360-degree volume of revolution of a trapezoidal area about the rotational symmetry axis describes the measurement gauge volume formed by a concentric arrangement of collimation channels about a central channel. For illustrative purposes cross sections through two such gauge volumes are highlighted in FIG. 4B. In this instance similar volume of revolution analysis can be applied to the triangular areas adjacent to the kite shaped area (through the bicone) and the trapezoidal areas to form a single volumetric shape comprised of all four gauge volume components. The addition of further concentric arrays of collimation channels will enable the total gauge volume to be expanded within the envelope of the conical shell beam in opposite directions along the symmetry axis. This analysis does not consider occlusion of the gauge volume due to the finite thickness of the septal channel walls. It also assumes that the sample extends over the total measurement gauge volume of the instrument.

Figure 4C:
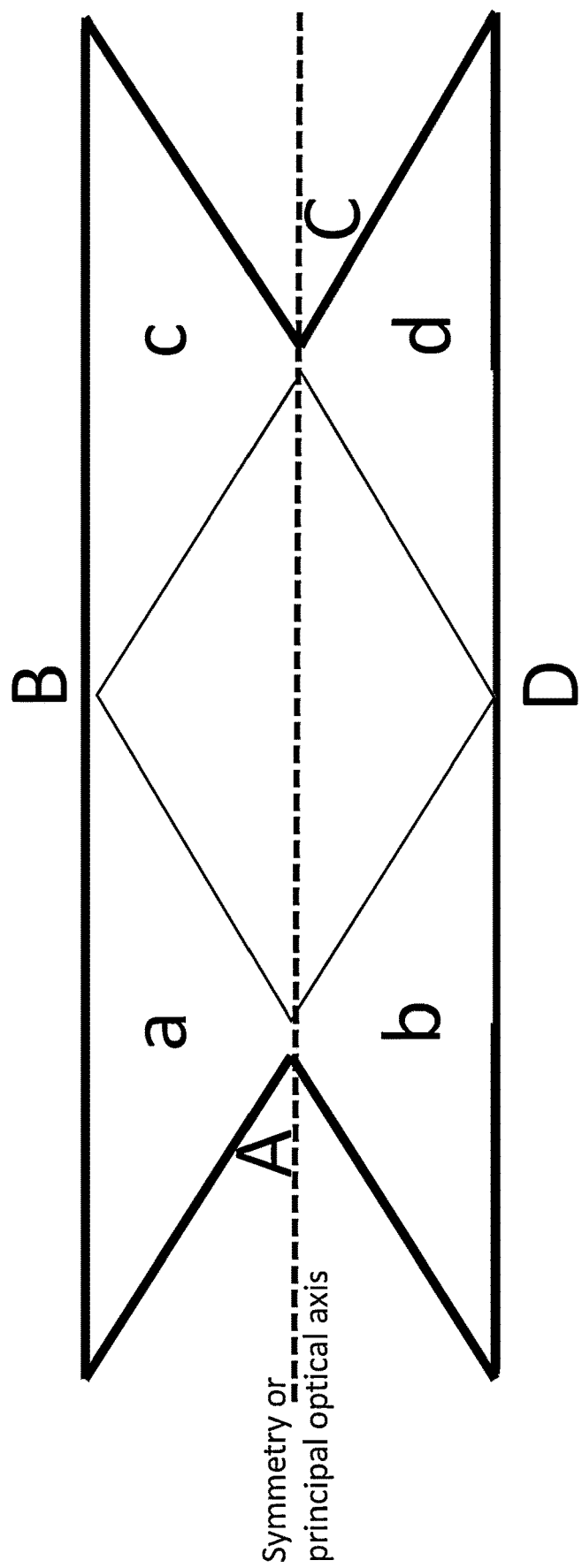
FIG. 4C is a simplified cross section through the measurement gauge volume of the system of FIG. 4A.

FIG. 4C shows a simplified cross section through the total measurement gauge volume of the system of FIG. 4A. The cross-section through the measurement gauge volume is bounded by a concave irregular bisymmetric hexagon. The volume of revolution about the principal axis forms a cylinder minus the volume of two identical right (mirror image) cones positioned with their bases coincident with the two end faces of the said cylinder.

Figure 4D:
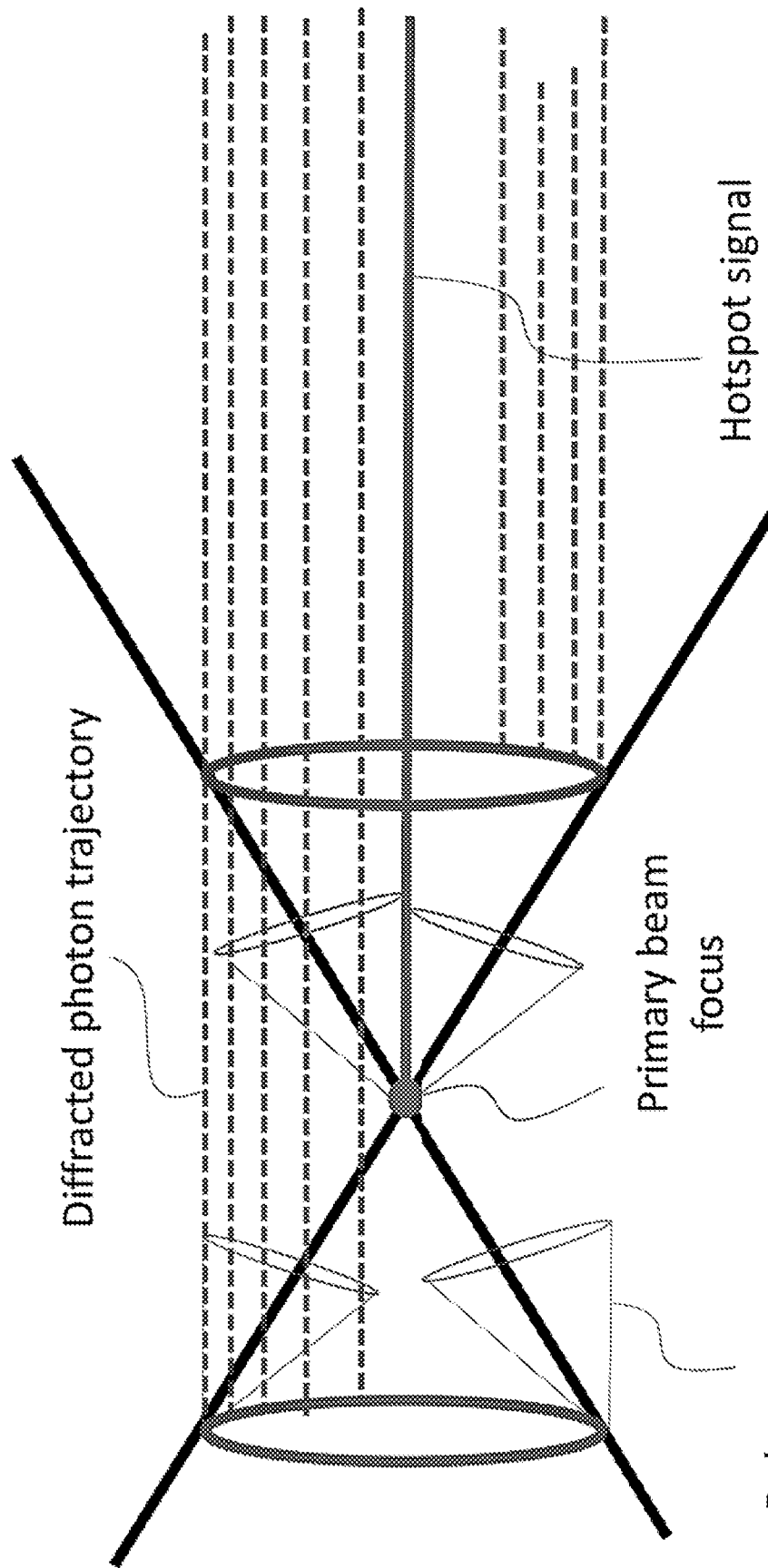
FIG. 4D is a diagram showing the diffracted photon trajectories parallel with the symmetry axis and originating from a circular conic section concentric about the symmetry axis of the system of FIG. 4A.

FIG. 4D is a diagram showing the diffracted photon trajectories originating from a circular conic section concentric about the symmetry/optical axis as would occur in FIG. 4A. The diffracted photon trajectories are parallel with the rotational symmetry axis. The integrated intensity around a circular path of incident photons yields an equivalent hotspot signal. There are two such circular integration paths shown in FIG. 4D producing a hotspot gain of three for the system in this example. This approximation assumes that the same amount of primary flux interrogates (or propagates through) the circular conic section as the associated or corresponding physical hotspot (or convergence point or focus). Thus, the amount of diffracted flux per unit time propagating along the symmetry axis is approximately equivalent to the amount of diffracted flux per unit time propagating within a coaxial cylindrical surface given the diffraction angle (2-theta) is the same in both cases. This approximation ignores the different beam path lengths and the effects of primary and diffracted beam attenuation and assumes that the specimen or measurement gauge volume has similar crystallographic parameters across the various conic sections and hotspot measurement gauge volumes. The photon trajectories are determined nominally by the individual primary axes of each channel composing the parallel channel collimator and ignores paraxial trajectories with small angular deviations due to the finite acceptance angle for each channel, and the attenuation produced by the septal walls between channels.

Figure 4E:
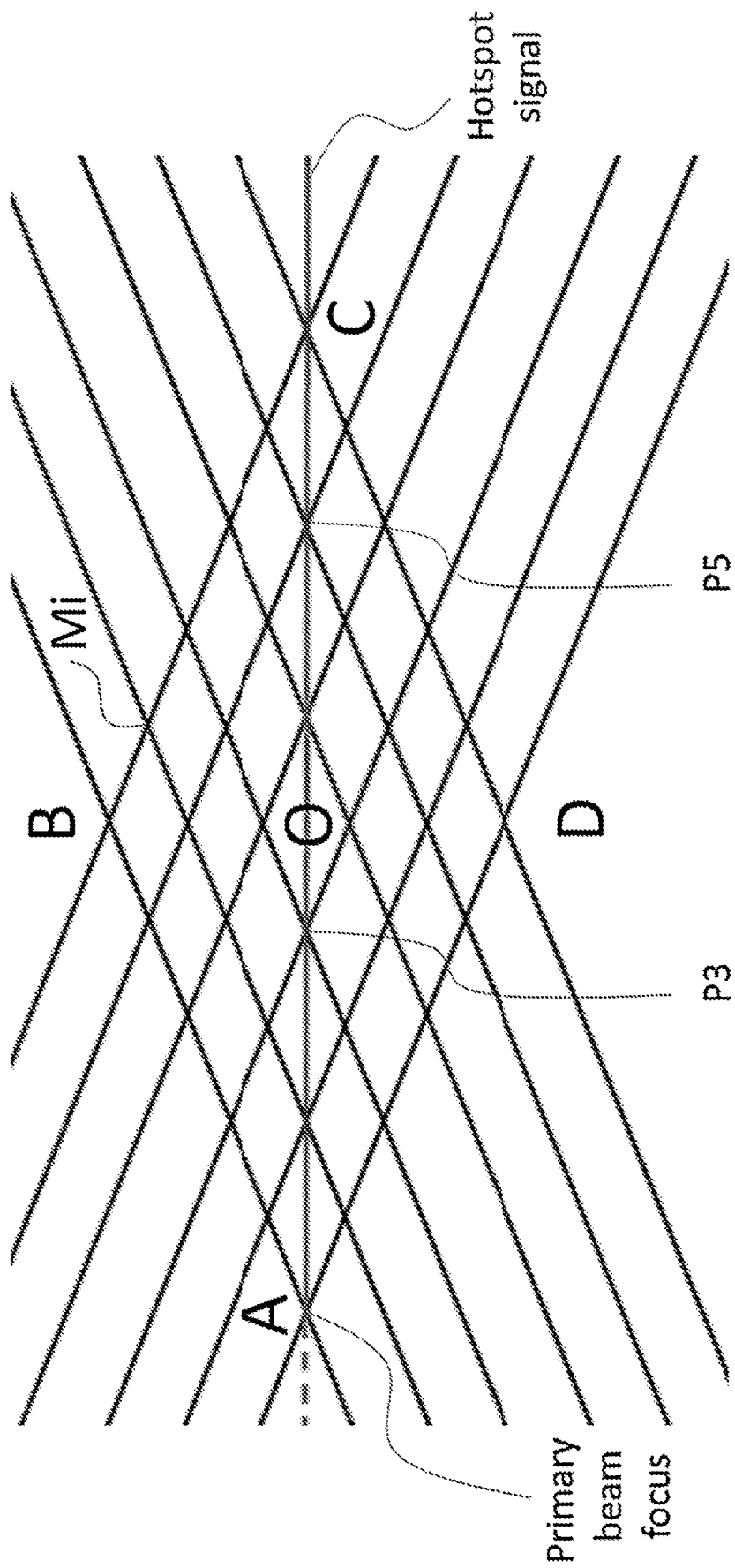
FIG. 4E is a close-up view of a beam interacting region of the diagram of FIG. 4A.

FIG. 4E is a close-up view of a beam interacting region of the diagram of FIG. 4A. The diagram assumes that the inner shell beam envelope angle and the outer shell beam envelope angle are equal meaning that each beam in the system is represented by an infinitesimally thin shell. These angles are defined and illustrated in FIG. 4B above. The intersection of the conical shell beams with each other in the cross-sectional diagram forms a rhombus region (ABCD) that includes a plurality of nodes labelled Mi. The rhombus region (ABCD) shows 36 nodes: 15 from the top section (ABC) excluding the horizontal symmetry axis of the rhombus, and 15 from the bottom section (ADC) excluding the horizontal symmetry axis of the rhombus, and a further 6 nodes along the horizontal symmetry axis.

Figure 4F:
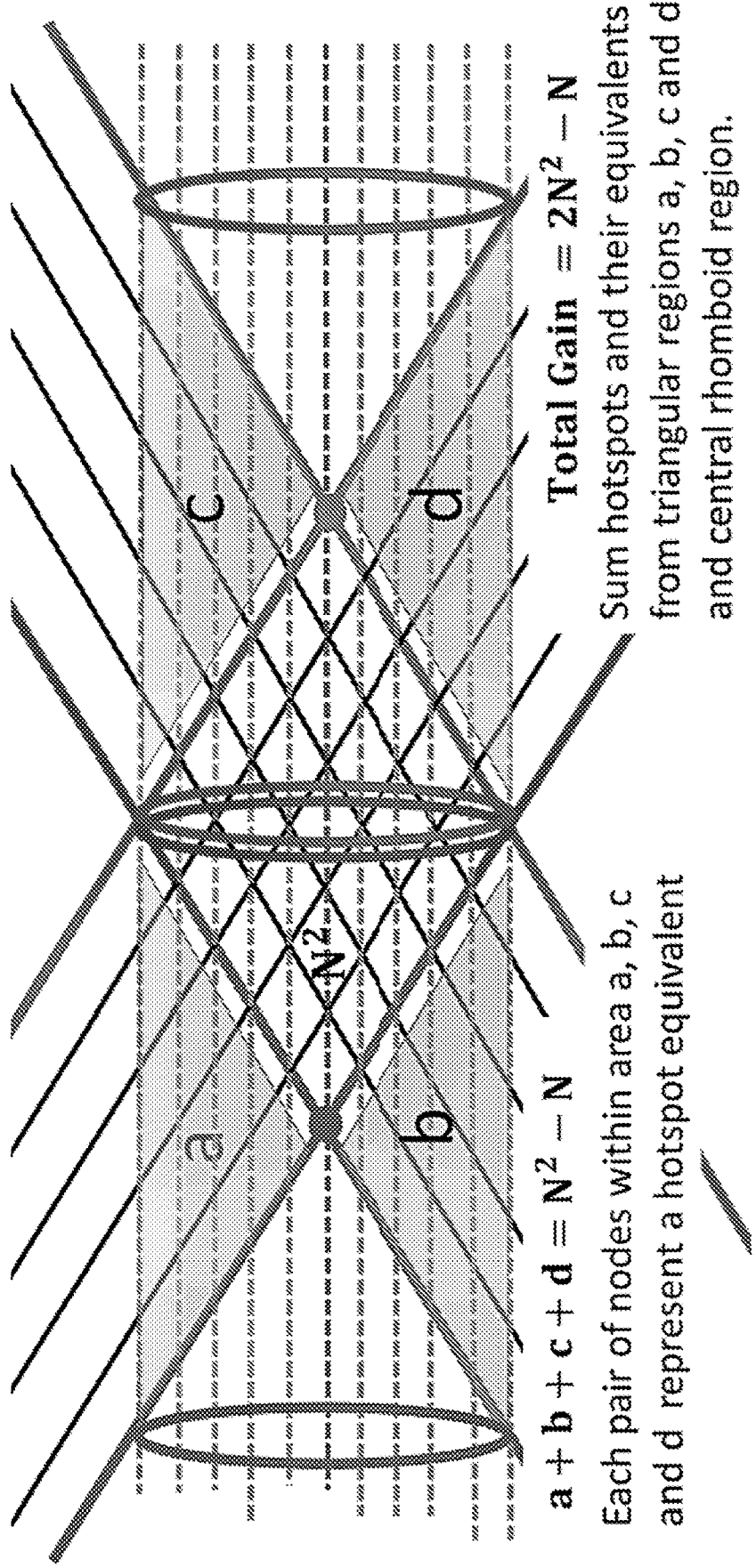
FIG. 4F is another close-up view of the beam interacting region of the diagram of FIG. 4A.

FIG. 4F is another is a close-up view of a beam interacting region of the diagram of FIG. 4A. FIG. 4F illustrates the various regions which are taken into account for the calculation of the total gain. A gain provided by the proposed system can be estimated using the following analysis which neglects beam attenuation and septal occlusion and finite tangential and radial expansion of each shell beam. Circular conic sections are formed by a pair of intersecting shell beams; each such double-section yields two hotspot signal equivalents in terms of the integrated intensity of diffracted flux received from node A or any other isolated node representing a hotspot or single beam apex on the symmetry axis. This is because the total number of primary interrogating photons per unit time passing through a conic section is conserved at the associated hotspot where all photon trajectories intersect; as a result the total number of nodes around, but not on the symmetry axis, is $N^2-N$ (For $N=6$, $N^2-N=30$). Consequently, a substitute for the hotspot gain is provided by the total number of nodes in the rhombus which is given by $N^2-N+N=N^2$. In our example, the 36 nodes include the 6 foci P1-P6 (30+6=36).

One also needs to consider the nodes present in four triangular regions corresponding to the take-off conic sections a, b, c, d shown in FIG. 4F. Circular conic sections are formed by the cylindrical collimator take-off; through symmetry these equate to $N^2-N$. By summing the nodes within the rhombus ABCD of FIG. 4E and the four triangular regions a, b, c d, in FIG. 4F the total normalised gain=$2N^2-N$. This formula assumes that the total number of collimation channels aligned along the diameter of the collimator array (with their principal axes coplanar with a cross section through the symmetry axis)=$2N-1$. Thus a single focused shell beam $N=1$ has a single channel collimator (with its principal axis coincident with the symmetry axis) and a gain of unity. Whereas the six-beam system $N=6$ shown in FIG. 4A has 11 collimation channels bisected in the plane of the drawing and a gain of 66. In general, the total number of collimator channels can be increased or decreased to accommodate specific demands. For example, the single shell beam shown in FIG. 4B has three collimation channels in the plane of the diagram rather than a single channel as indicated by the expression $2N-1$.

In a further numerical example, for $N=8$ beams, the gain is equal to 120, corresponding to approximately a two orders of magnitude increase. The multi-confocal geometry of the system of FIG. 4 permits probing a tissue with low doses of X-ray radiation and/or shorter exposure times, hence lowering a risk of tissue damage and preserving the health and wellbeing of the patient.

Figure 5:
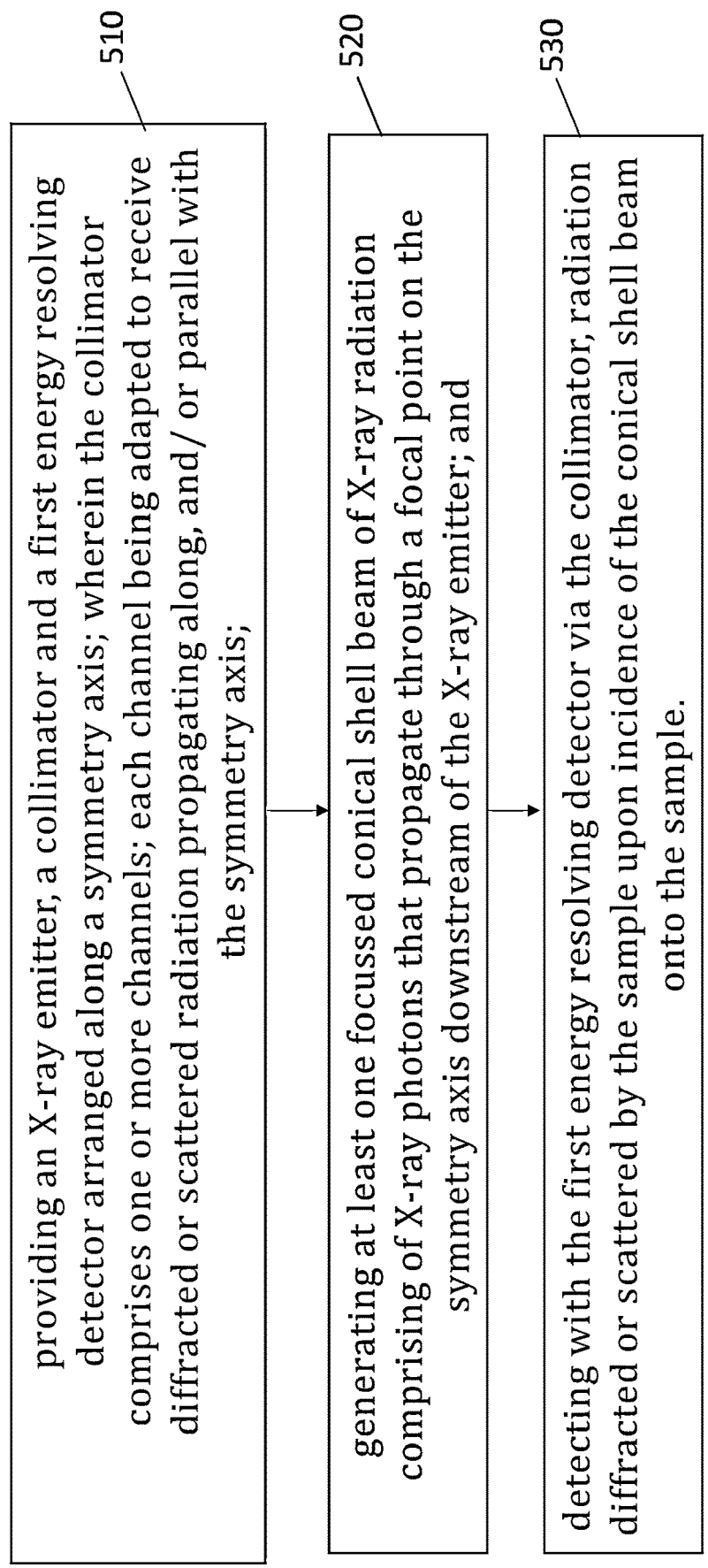
FIG. 5 is a flow chart of a method for identifying a physico-chemical structure of a sample.

FIG. 5 is a flow chart of a method for inspecting a sample. For instance, the method can be used for identifying a physico-chemical structure of a sample or body region.

At step 510, an X-ray emitter, a collimator, and a first energy resolving detector arranged along a symmetry axis are provided. The collimator comprises one or more channels; each channel being adapted to receive diffracted or scattered radiation propagating along and/or parallel with the symmetry axis.

At step 520, at least one focused conical shell beam of X-ray radiation is generated. The focused conical shell beam comprises of X-ray photons that propagate through a focal point on the symmetry axis downstream of the X-ray emitter.

At step 530, upon incidence of the conical shell beam onto the sample the radiation diffracted or scattered by the sample is detected with the first energy resolving detector via the collimator.

The physico-chemical structure of the sample can be identified based on the detected diffracted or scattered radiation. This approach eliminates the need for invasive procedures and also the requirement for expert histological analyses.

The proposed system and method of the disclosure as described with reference to FIGS. 1 to 5 enables the non-invasive measurement of structural and/or molecular information that cannot be acquired with conventional methods.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications can be made without significant changes to the operation described.

The invention claimed is:

1. A sample inspection system comprising:
   an X-ray emitter;
   a collimator; and
   a first energy resolving detector arranged along a symmetry axis,
   wherein the X-ray emitter is adapted to generate at least one focused conical shell beam of X-ray radiation comprised of X-ray photons that propagate through a focal point on the symmetry axis downstream of the X-ray emitter,
   wherein the collimator comprises one or more channels, each channel being adapted to receive diffracted or scattered radiation propagating either along the symmetry axis, or parallel with the symmetry axis, or both along and parallel with the symmetry axis, and
   wherein upon incidence of the conical shell beam onto a sample the first energy resolving detector is arranged to detect radiation diffracted or scattered by the sample via the collimator.

2. The sample inspection system as claimed in claim 1, wherein the X-ray photons propagate radially to trace the surface of a double cone with all X-ray photon trajectories crossing the focal point on the symmetry axis, and wherein the focal point forms an apex of the double cone.

3. The sample inspection system as claimed in claim 1, wherein the X-ray emitter comprises an X-ray source, an X-ray lens, and a beam former.

4. The sample inspection system as claimed in claim 3, wherein the beam former comprises one or more slits.

5. The sample inspection system as claimed in claim 3, wherein the beam former is movable along the symmetry axis.

6. The sample inspection system as claimed in claim 3, wherein the X-ray lens comprises a polycapillary optical element.

7. The sample inspection system as claimed in claim 3, wherein the X-ray lens comprises at least one of a compound refractive lens, a bent crystal, and a Laue lens.

8. The sample inspection system as claimed in claim 3, wherein the X-ray lens is movable along the symmetry axis to focus an input beam at a plurality of focal points on the symmetry axis.

9. The sample inspection system as claimed in claim 1, wherein the X-ray emitter can generate a plurality of focused conical shell beams of X-ray radiation, and wherein each beam has a different energy and a different opening angle.

10. The sample inspection system as claimed in claim 1, wherein the first energy resolving detector is spatially resolving.

11. The sample inspection system as claimed in claim 1, further comprising a second energy resolving detector.

12. The sample inspection system as claimed in claim 11, wherein the second energy resolving detector has an annular shape for detecting X-ray radiation transmitted through the sample.

13. The sample inspection system as claimed in claim 1, further comprising:
a calculator configured to calculate a parameter of the sample based on scattered or diffracted radiation detected by the first energy resolving detector, wherein the parameter comprises a lattice spacing of the sample.

14. The sample inspection system as claimed in claim 13, wherein the calculator is configured to identify a physico-chemical structure of the sample based on the detected diffracted or scattered radiation.

15. The sample inspection system as claimed in claim 13, wherein the calculator is configured to calculate variations between positions, widths and relative heights of scattering maxima obtained from the sample and from a reference sample.

16. The sample inspection system as claimed in claim 13, wherein the calculator is configured to compare the lattice spacing of the sample with pre-existing lattice spacing values of known tissue types or known material.

17. The sample inspection system as claimed in claim 13, wherein the calculator is configured to perform image reconstruction based on transmitted radiation detected by a second energy resolving detector.

18. A method of inspecting a sample, the method comprising:
providing an X-ray emitter, a collimator and a first energy resolving detector arranged along a symmetry axis,
wherein the collimator comprises one or more channels, each channel being adapted to receive diffracted or scattered radiation propagating along and/or parallel with the symmetry axis;
generating at least one focused conical shell beam of X-ray radiation comprising X-ray photons that propagate through a focal point on the symmetry axis downstream of the X-ray emitter; and
detecting with the first energy resolving detector via the collimator, radiation diffracted or scattered by the sample upon incidence of the conical shell beam onto the sample.

19. The method as claimed in claim 18, further comprising identifying a physico-chemical structure of the sample based on the detected diffracted or scattered radiation.

* * * * *